United States Patent
Zimmer (10) Patent No.: US 6,957,013 B2
(45) Date of Patent: Oct. 18, 2005

(54) FLUID HEATER

(75) Inventor: George M. Zimmer, Kent, WA (US)

(73) Assignee: Algas-SDI International LLC, Seattle, WA (US)

( * ) Notice: Subject to any disclaimer, the term of this patent is extended or adjusted under 35 U.S.C. 154(b) by 0 days.

(21) Appl. No.: 10/674,867

(22) Filed: Sep. 29, 2003

(65) Prior Publication Data

US 2004/0131344 A1 Jul. 8, 2004

Related U.S. Application Data

(63) Continuation-in-part of application No. 09/878,838, filed on Jun. 8, 2001, now Pat. No. 6,707,987.
(60) Provisional application No. 60/421,296, filed on Oct. 25, 2002.

(51) Int. Cl.[7] ................................................ F22B 29/06
(52) U.S. Cl. ...................................... 392/397; 431/208
(58) Field of Search ................................ 392/386, 384, 392/394, 397, 479–497; 165/164, 165, 167, 172–176; 431/208, 209, 210; 239/135, 136, 139; 261/142, 171.65

(56) References Cited

U.S. PATENT DOCUMENTS

| | | | |
|---|---|---|---|
| 2,856,759 A | 10/1958 | Barbulesco | ................. 62/211 |
| 3,250,723 A | 5/1966 | Fortney | ..................... 392/397 |
| 3,475,916 A | 11/1969 | Smith | ........................... 62/52 |
| 3,676,642 A | 7/1972 | Rosen et al. | ................ 219/301 |

(Continued)

FOREIGN PATENT DOCUMENTS

| | | |
|---|---|---|
| DE | 764 226 | 6/1953 |
| DE | 12 33 889 | 2/1967 |
| EP | 0 243 077 | 10/1987 |
| EP | 1 139 007 | 10/2001 |

*Primary Examiner*—Sang Y. Paik
(74) *Attorney, Agent, or Firm*—Seed IP Law Group PLLC (57) ABSTRACT

A fluid heater having a first heat exchanger block with a fluid heating tube encased therein, and having a first surface, a second heat exchanger block with a fluid heating tube encased therein and having a second surface adjacent to the first surface. A cavity is formed in the surface of the first block, or, alternatively, formed in each of the surfaces of the first and second blocks. A heating element is positioned within the cavity and completely encapsulated by the first and second blocks. The heating element may include first and second bus plates and a plurality of PTC elements sandwiched between the bus plates in an electrically parallel configuration, each PTC element including first and second conductive plates, and a plurality of positive temperature coefficient heating stones sandwiched between the conductive plates in an electrically parallel configuration.

32 Claims, 6 Drawing Sheets

U.S. PATENT DOCUMENTS

| | | | | |
|---|---|---|---|---|
| 3,782,456 A | * | 1/1974 | Gusmer | 165/164 |
| 3,964,859 A | | 6/1976 | Nishi et al. | 431/78 |
| 4,032,070 A | | 6/1977 | Nielsen | 236/92 B |
| 4,230,935 A | * | 10/1980 | Meixner | 219/523 |
| 4,255,646 A | | 3/1981 | Dragoy et al. | 219/275 |
| 4,327,282 A | * | 4/1982 | Nauerth | 219/541 |
| 4,334,141 A | | 6/1982 | Roller et al. | 219/283 |
| 4,343,988 A | | 8/1982 | Roller et al. | 219/302 |
| 4,371,777 A | | 2/1983 | Roller et al. | 219/298 |
| 4,399,349 A | | 8/1983 | Deming et al. | 219/276 |
| 4,465,458 A | | 8/1984 | Nishino et al. | 431/208 |
| 4,483,304 A | | 11/1984 | Yokoi et al. | 123/549 |
| 4,625,910 A | | 12/1986 | Kawamura | 237/2 A |
| 4,645,904 A | | 2/1987 | Moraski et al. | 219/275 |
| 4,713,524 A | | 12/1987 | Leo et al. | 219/307 |
| 4,811,720 A | | 3/1989 | Katumata et al. | 123/527 |
| 4,814,584 A | * | 3/1989 | Bohlender et al. | 219/535 |
| 4,874,924 A | | 10/1989 | Yamamoto et al. | 219/274 |
| 4,898,142 A | | 2/1990 | Van Wechem et al. | 123/557 |
| 4,903,850 A | | 2/1990 | Frank et al. | 219/271 |
| 5,005,370 A | | 4/1991 | Tanaka et al. | 62/211 |
| 5,057,672 A | | 10/1991 | Bohlender et al. | 219/540 |
| 5,182,942 A | | 2/1993 | Hartel et al. | 73/61.46 |
| 5,400,969 A | | 3/1995 | Keene | 239/136 |
| 5,401,935 A | | 3/1995 | Smith et al. | 219/206 |
| 5,609,297 A | | 3/1997 | Gladigow et al. | 239/135 |
| 5,644,866 A | | 7/1997 | Katsuda et al. | 43/129 |
| 5,796,914 A | | 8/1998 | Gatzemeyer et al. | 392/390 |
| 5,825,975 A | | 10/1998 | Privas | 392/404 |
| 5,870,524 A | | 2/1999 | Swiatosz | 392/394 |
| 5,873,354 A | | 2/1999 | Krohn et al. | 123/549 |
| 5,947,091 A | | 9/1999 | Krohn et al. | 123/549 |
| 5,966,499 A | | 10/1999 | Hinkle et al. | 392/388 |
| 5,995,711 A | | 11/1999 | Fukuoka et al. | 392/347 |
| 6,005,228 A | | 12/1999 | Dickens et al. | 219/483 |
| 6,037,567 A | | 3/2000 | Inoue et al. | 219/202 |
| 6,044,825 A | | 4/2000 | Carter et al. | 123/557 |
| 6,058,915 A | | 5/2000 | Abidin et al. | 123/546 |
| 6,076,359 A | | 6/2000 | Jurcik et al. | 62/50.2 |
| 6,124,570 A | | 9/2000 | Ebner et al. | 219/202 |
| 6,157,774 A | | 12/2000 | Komino et al. | 392/387 |
| 6,455,822 B1 | | 9/2002 | Chang | 219/540 |

* cited by examiner

FLUID HEATER

CROSS-REFERENCE TO RELATED APPLICATION

This application claims the benefit of U.S. Provisional Patent Application No. 60/421,296 filed Oct. 25, 2002, which provisional application is incorporated herein by reference in its entirety. This application is a continuation-in-part of U.S. patent application Ser. No. 09/878,838, filed Jun. 8, 2001 now U.S. Pat. No. 6,707,987, now pending, which application is incorporated herein by reference in its entirety.

BACKGROUND OF THE INVENTION

1. Field of the Invention

This invention relates to a heater for heating fluids. More particularly, to a heater for water or vaporizing liquefied gases such as liquefied petroleum gas.

2. Description of the Related Art

Fluid heaters for the heating and controlled vaporization of liquefied gases are generally known. One electrically heated liquefied petroleum gas (LPG) vaporizer is disclosed in U.S. Pat. No. 4,255,646. Another liquefied gas vapor unit is disclosed in U.S. Pat. No. 4,645,904. Typically, the vaporizer includes a hollow pressure vessel having a liquefied gas inlet near a lower end and a gas vapor outlet near a closed upper end remote from the liquefied gas inlet. A heating core is typically disposed within the pressure vessel, usually positioned close to the lower end. A plurality of resistive electric heating element may be embedded within the heating core.

Such vaporizers using electric heating elements often require the use of a temperature sensor coupled with a time proportional controller for applying power to the heating elements with a periodic on/off duty cycle determined by the deviation of the core temperature from a predetermined set point. If there is an increase of the core temperature above the set point the control circuit reduces the on time of the duty cycle to reduce the temperature. If the core temperature is below the set point, the control circuit increases the on time of the duty cycle. Complex control circuitry and switches are required.

Such known vaporizer may also have a liquefied gas sensor communicating with the interior of the pressure vessel near its upper end, below the gas vapor outlet. The liquefied gas sensor is typically an overflow sensor or "float switch" for sensing the level of liquefied gas in the pressure vessel and controlling a valve that opens and closes to stop the flow of liquefied gas into the pressure vessel. Accordingly, the valve is controlled to open the pressurized flow of liquefied gas into the pressure vessel and to shut off the flow before the liquefied gas fills the gas vapor head space and liquefied gas floods through the outlet of the vaporizer.

A problem with such known fluid heaters is the need to control the on/off duty cycle of the electric heater elements to prevent overheating. The circuitry required creates safety concerns and, in addition, maintenance and reliability concerns are created. Further, the circuitry increases the cost of manufacturing the fluid heaters.

Another problem common to most known fluid heaters is that, due to the presence of extremely volatile gasses, as well as a combustion source in the form of an electrical circuit and heat source, there is a potential of an explosion. As a result, the fluid heaters must be sufficiently encased in a protective shielding to suppress an internal explosion if they are used in environments that include other combustion or explosion dangers. Such shielding adds expense, weight and size to the fluid heaters, as well as making maintenance issues more complex.

BRIEF SUMMARY OF THE INVENTION

According to one embodiment of the present invention, a fluid heater is provided, including a first heat exchanger block, a fluid heating tube configured to receive a fluid to be heated, and a second heat exchanger block having a second fluid heating tube configured to receive a fluid to be heated. The first block and the second block have their internal surfaces facing each other. A heating unit is positioned between the first and second heat exchange blocks. In one embodiment, the heating unit is a positive temperature coefficient (PTC) heater, having one or more individual elements. A cavity may be formed between the two heat exchanger blocks in which the PTC elements are placed, or they may be positioned adjacent the heat exchange blocks without such a cavity.

In accordance with an embodiment of the invention, first and second bus plates provide power to a plurality of PTC elements sandwiched between the bus plates in an electrically parallel configuration. Each PTC element includes first and second conductive plates, and a plurality of positive temperature coefficient heating stones sandwiched between the conductive plates in an electrically parallel configuration.

DETAILED DESCRIPTION OF THE INVENTION

Figure 1:
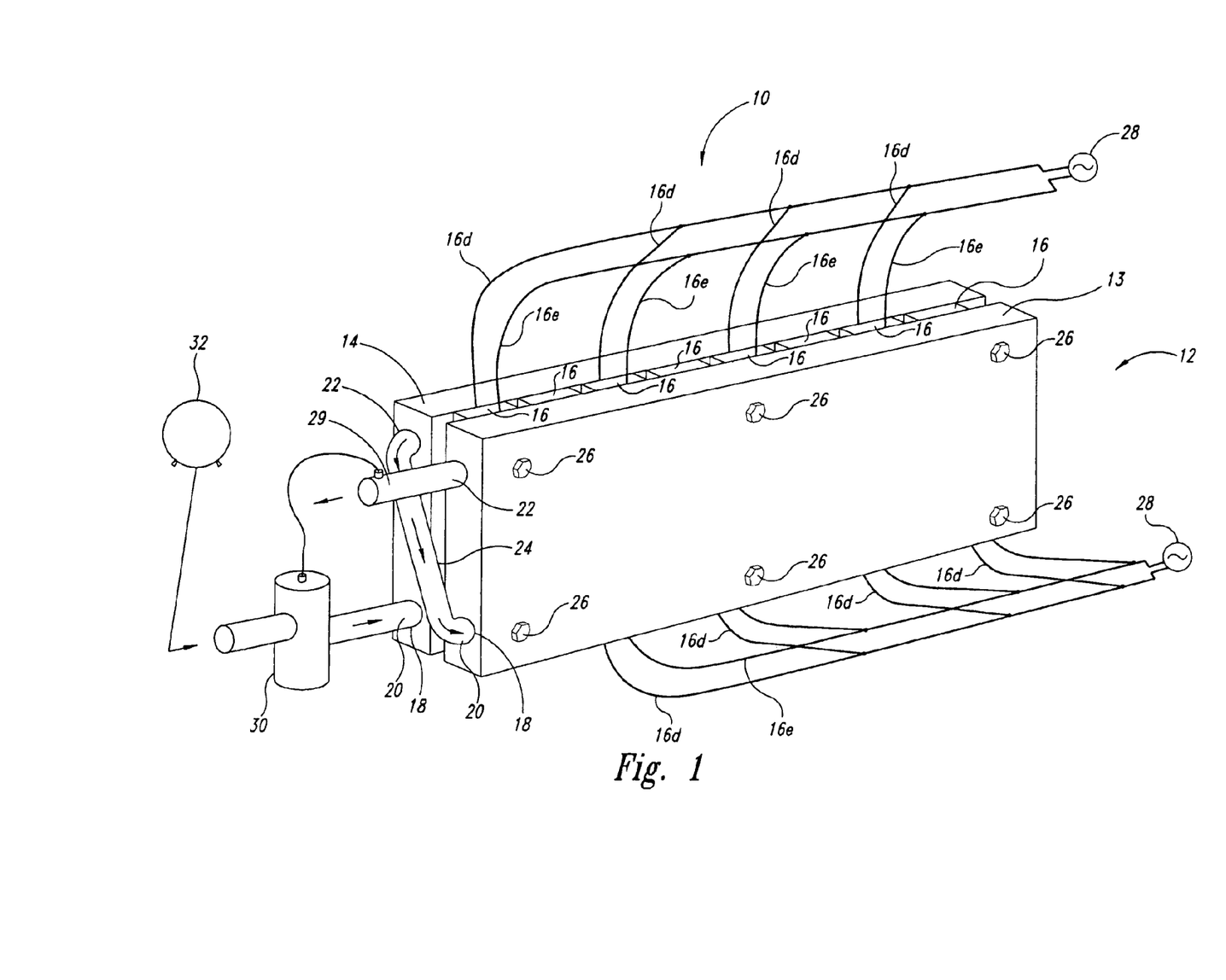
FIG. 1 is an isometric view of a fluid heater embodying the present invention having a heat exchanger comprised of two stacked heat exchanger blocks and a capacity control valve.
Figure 2:
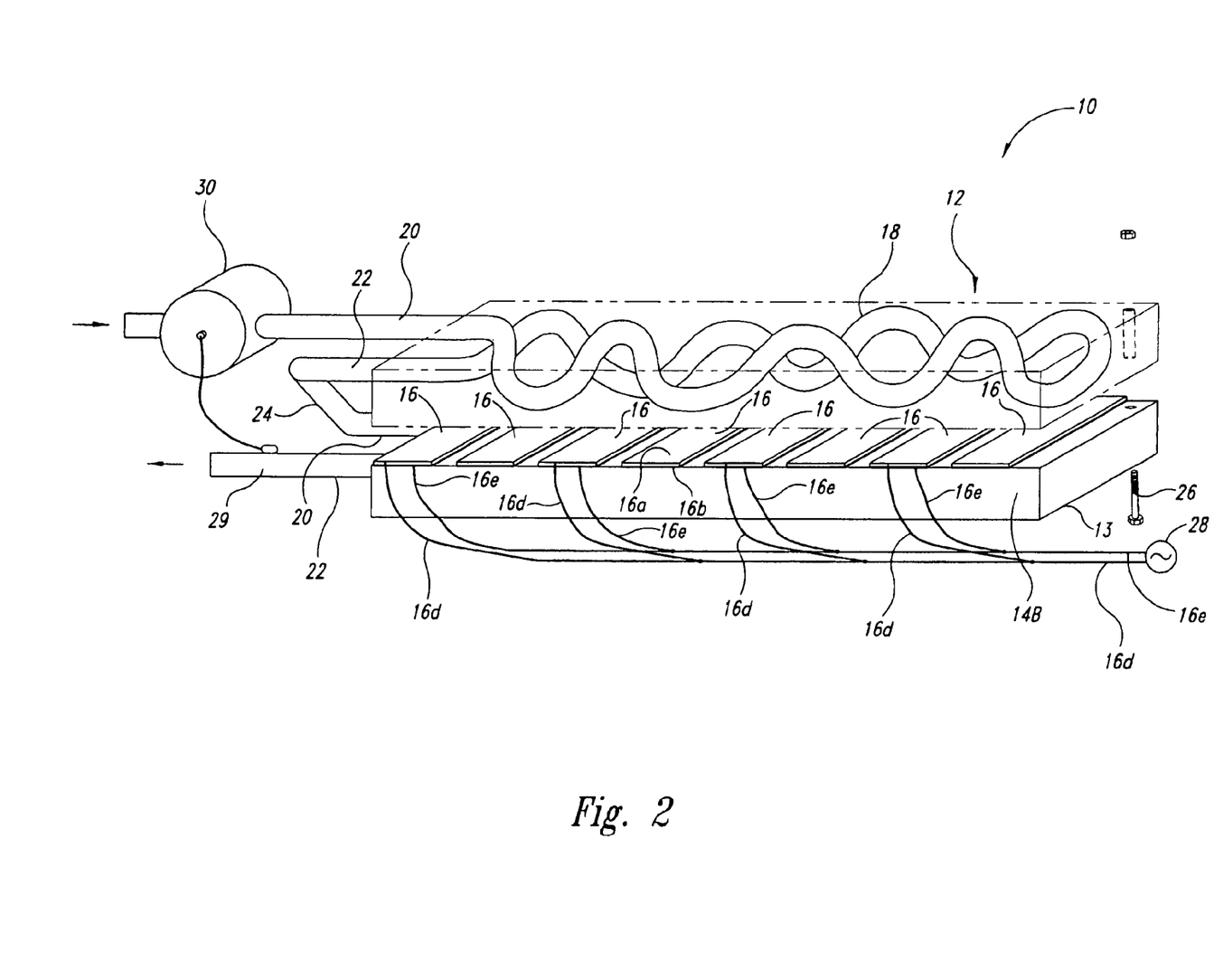
FIG. 2 is an isometric, exploded view of the fluid heater of FIG. 1 with one to the heat exchanger blocks show in phantom line to better illustrate a tube encased therein and heating elements.

The heater 10 includes a heat exchanger 12 comprised of two heat exchanger blocks 13 and 14 mounted face-to-face with eight positive temperature coefficient (PTC) heating elements 16 sandwiched between the heat exchanger blocks 13 and 16. In practice, the number of PTC heating elements may vary as required by the application. The number may vary from six or fewer, to fourteen or more.

Figure 3:
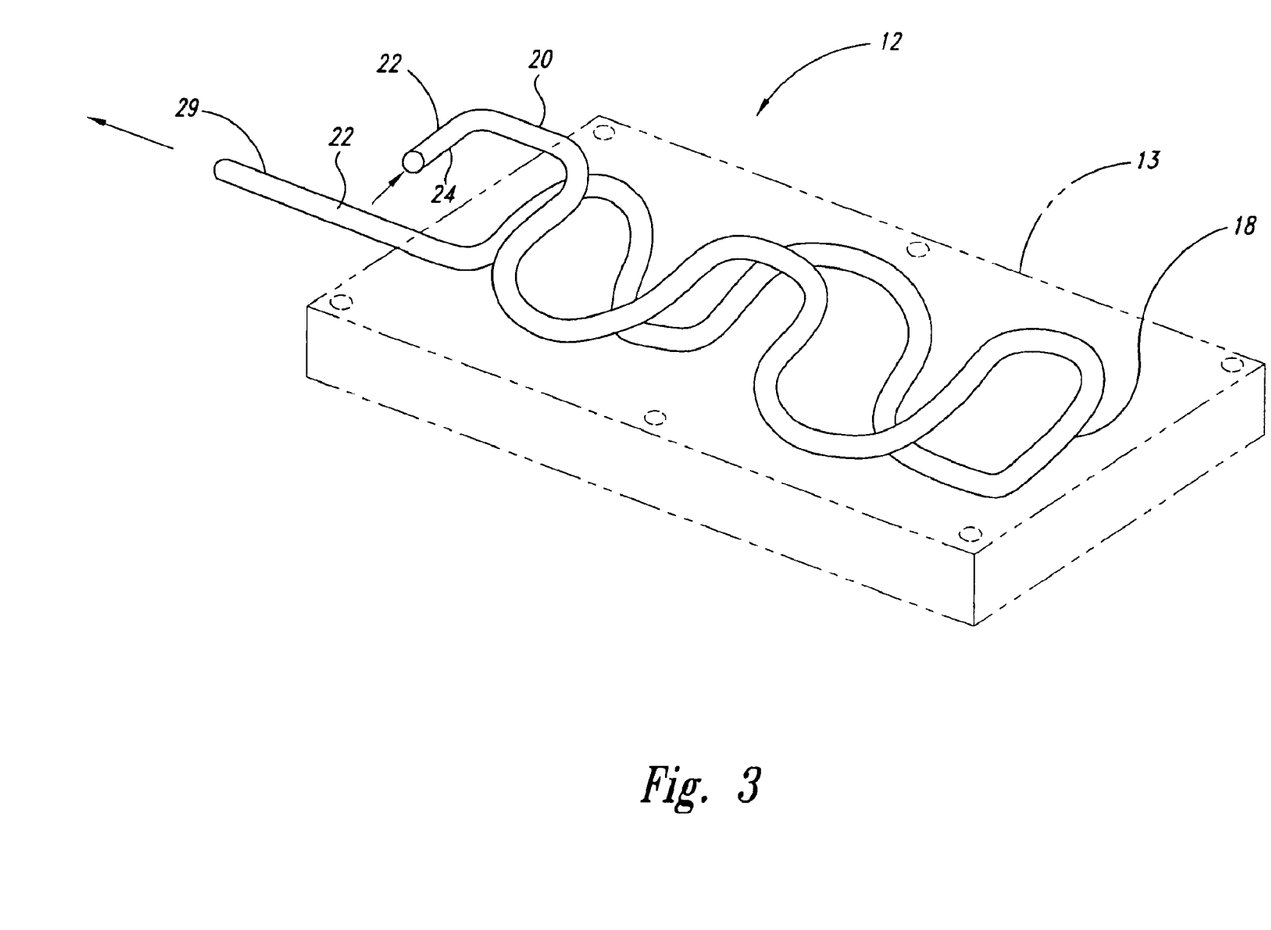
FIG. 3 is an isometric view of a tube used in each of the heat exchanger blocks of the fluid heater of FIG. 1.

Each of the heat exchanger blocks 13 and 14 is formed of a casting of a thermally conductive material, such as aluminum, with an integral fluid heating tube 18 therein, as best shown in FIGS. 2 and 3. Each of the fluid heating tubes 18 has an inlet 20 and an outlet 22. The fluid heating tubes 18 of the heat exchanger blocks 13 and 14 are coupled together in series by a coupler tube 24 connecting the outlet 22 of the fluid heating tube 18 of the first heat exchanger block 13 and the inlet 20 of the fluid heating tube 18 of the second heat exchanger block 14.

The tubes 18 can be formed within the blocks 13 and 14 by any acceptable technique. One way is to provide the tubes 18 as stainless steel, carbon steel, or aluminum tubes of the proper shape and size and cast the aluminum around these tubes in place to obtain the final blocks 13 and 14. Another acceptable technique is to cast blocks 13 and 14 having the tubes formed within the blocks as part of the casting process. Other techniques also may be used.

The heat exchanger blocks 14 are secured tightly together in face-to-face relation with the heating elements 16 sandwiched between them by a plurality of fasteners 26, such as bolts or alternatively other fasteners or clamps. An electrical power supply 28, preferably between 100 to 240 volts, supplies electrical power to the heating elements 16. A fluid rate capacity control valve 30 is coupled to the inlet 20 of the vaporization tube 18 of the first heat exchanger block 13 and controls the flow of fluid from a fluid source 32, such as a liquefied petroleum gas storage tank, for example, to the heat exchanger 12 where it is heated and caused to vaporize. The vaporized fluid exits through the outlet 22 of the fluid heating tube 18 of the second heat exchanger block 14 and is supplied to an outlet tube 29.

Figure 4A:
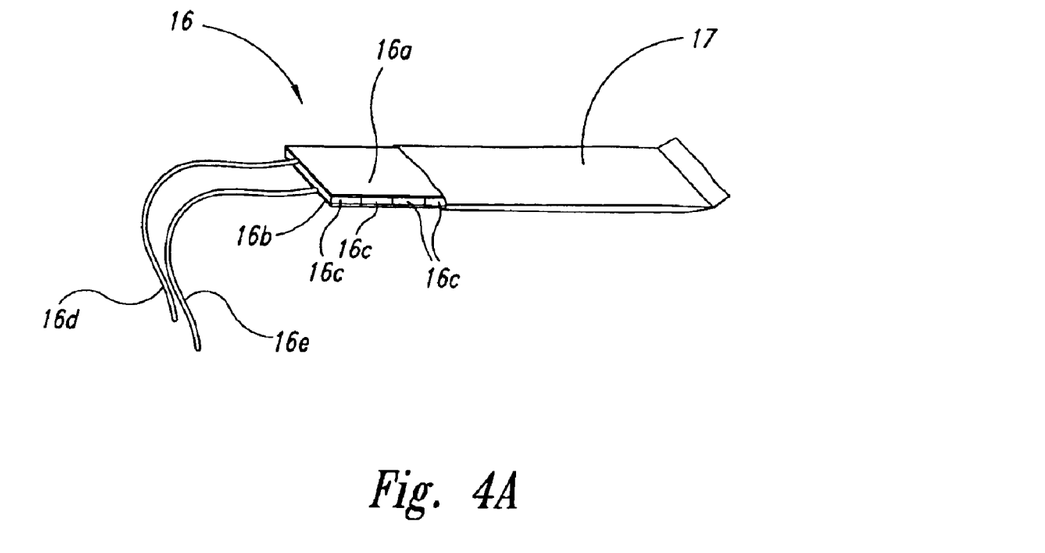
FIG. 4A is an isometric view of a positive temperature coefficient (PTC) heating element used to supply heat to the heat exchanger blocks of the fluid heater of FIG. 1.
Figure 4B:
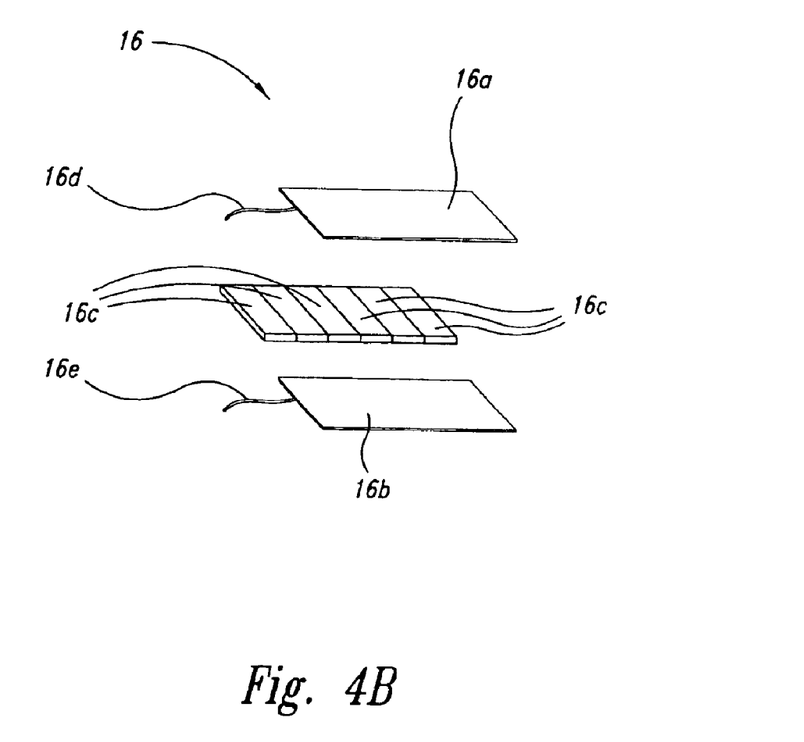
FIG. 4B is an exploded view of the PTC heating element of FIG. 4A, showing placement of the individual stones.

One of the PTC heating elements 16 used in the heater 10 is shown in FIG. 4A, with an exploded view shown in FIG. 4B. Such PTC heating elements are well known and include a pair of spaced-apart planar conductive plates 16a and 16b with a plurality of individual heat producing components, called "stones" in the art. Each stone heats as current passes through it. The stones 16c are positioned between the conductive plates. The PTC heating elements 16 have a flat, low side profile. An electrical lead 16d is attached to the end of plate 16a and an electrical lead 16e is attached to the end of plate 16b to supply a voltage across the stones between the conductive plates, such that all the stones are connected to the supply voltage in parallel. The stones 16c are arranged in a row between the conductive plates 16a and 16b with each stone having one face in electrical contact with conductive plate 16a and an opposite face in electrical contact with conductive plate 16b. Current passes through the stones from plate 16a to plate 16b to heat them.

The stones 16c are composed of a thermally sensitive semiconductor resistor material that generates heat in response to a voltage applied across it by the conductive plates 16a and 16b, and have the characteristic of producing substantially the same heat output regardless of the voltage applied across it. As such, the PTC heating elements 16 produce a very constant heat output independent of the voltage used for the electrical power supply 28. This avoids having to carefully and accurately regulate the power source for the PTC heating elements 16 as is required in conventional electrical heaters so as to produce the desired heat. This produces a simpler and less expensive heater. It also reduces the need and expenses incurred with conventional heaters requiring highly regulated power when adapting them for use in countries that have very different power supply systems from each other. The PTC heating elements 16 allow wide use without regard for the power supply system providing the electrical power for the heating elements.

In one embodiment of the invention described, the PTC heating element is the EB style, using 5 stones sold by Dekko Enterprise of North Webster, Ind. A sample of the EB style, 5 stone PTC heating elements has produced a surface temperature ranging from 103 to 117 degrees Centigrade when the voltage ranges from 120 volts to 230 volts, respectively.

In one embodiment, each of the PTC heating elements 16 is packaged in an electrically isolating jacket 17 formed of a material having a high coefficient of thermal conductivity. The jacket 17 is shown in FIG. 4A partially removed to reveal the conductive plates 16a and 16b of the PTC heating element 16.

When the PTC heating elements 16 are tightly sandwiched between the conductive metal heat exchanger blocks to promote good thermal conductivity therewith, the jacket 17 prevents the conductive plates 16a and 16b of the heating element from making electrical contact with the heat exchanger blocks, while at the same time permitting the efficient transfer of the heat generated by the heating element through the jacket to the heat exchanger blocks. The electrically isolating, heat conductive jacket 17 of the PTC heating elements 16 may be made of KAPTON®, a polyamide film presently available from du Pont de Nemours and Company of Wilmington Del.

Other advantages are realized by using the PTC heating elements 16. As noted, the stones 16c are arranged in a row between the conductive plates 16a and 16b so that if one stone fails, the other stones between the conductive plates continue to operate and produce heat, thus making the heating element resistant to total failures. In this regard, as shown in FIG. 1, the leads 16d of the heating elements 16 are connected together, and the leads 16e of the heating elements are connected together, such that the heating elements are connected in parallel to the electrical power supply 28. With this arrangement, should one of the heating elements 16 fail completely, the other heating elements will continue to have power supplied, and to operate. A large enough number of heating elements 16 are used such that should some of the stones fail in several of the heating elements, or even several of the heating elements completely fail, the other heating elements will still provide enough heat to accomplish the desired heating of the fluid supplied to the heat exchanger 12.

Another advantage results from the fact that the PTC heating elements 16 are self-regulating in that they have a cure temperature at which they operate and they will reduce their power they output if the temperature of the environment in which they are operating starts to go above their cure temperature. Because the PTC heating elements are self-regulating, the electrical power supplied by the electrical power supply 28 is simply connected directly to the PTC heating elements 16 without fear of producing a dangerous situation where the temperature increases without control. This eliminates the need for expensive heating element temperature control circuitry as required for conventional resistive heating elements and eliminates the fear of overheating.

Figure 5:
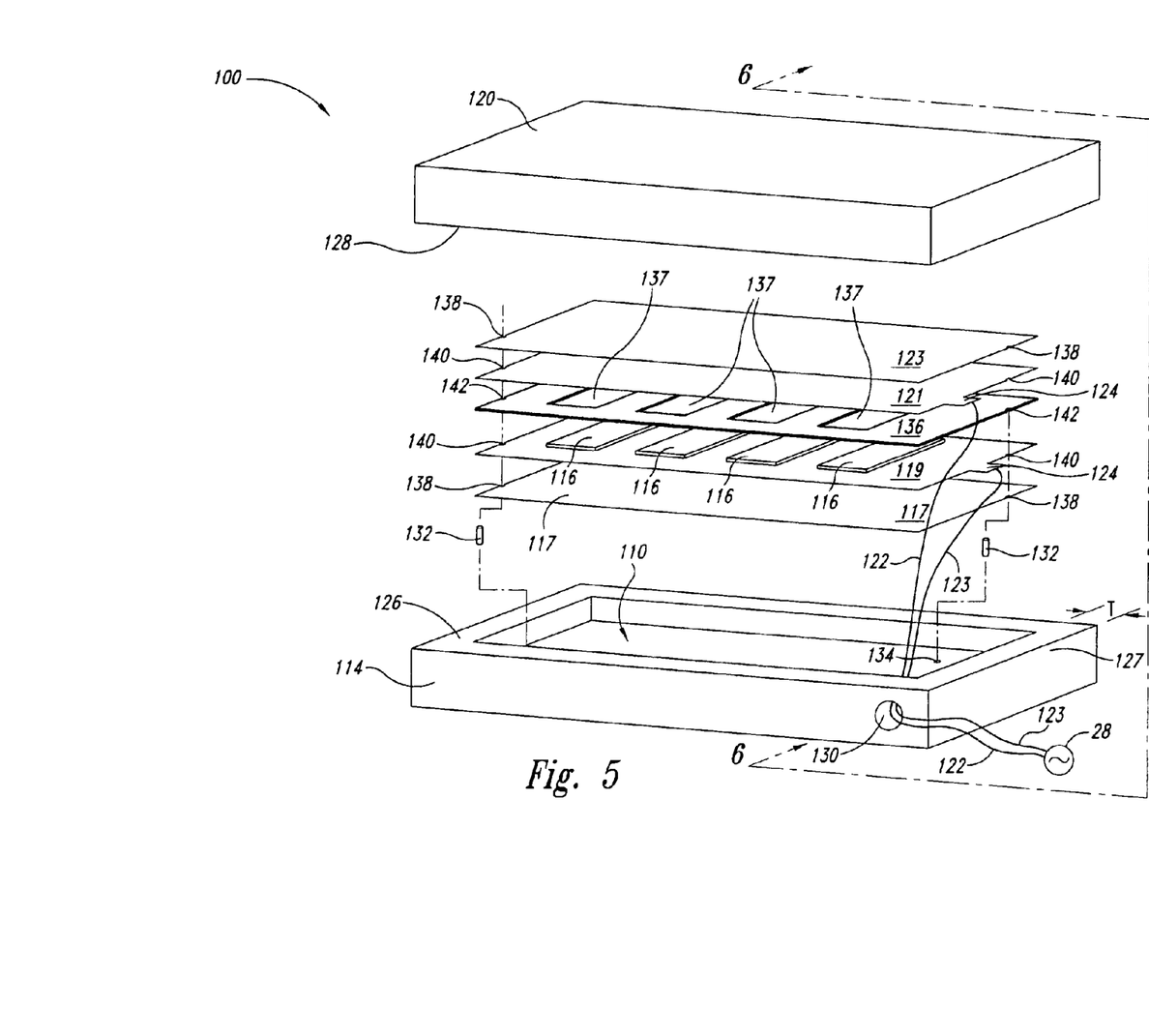
FIG. 5 is an exploded isometric view of a second embodiment of the invention, showing the positioning of the components of the heating element within the cavity of the heat exchanger block.
Figure 6:
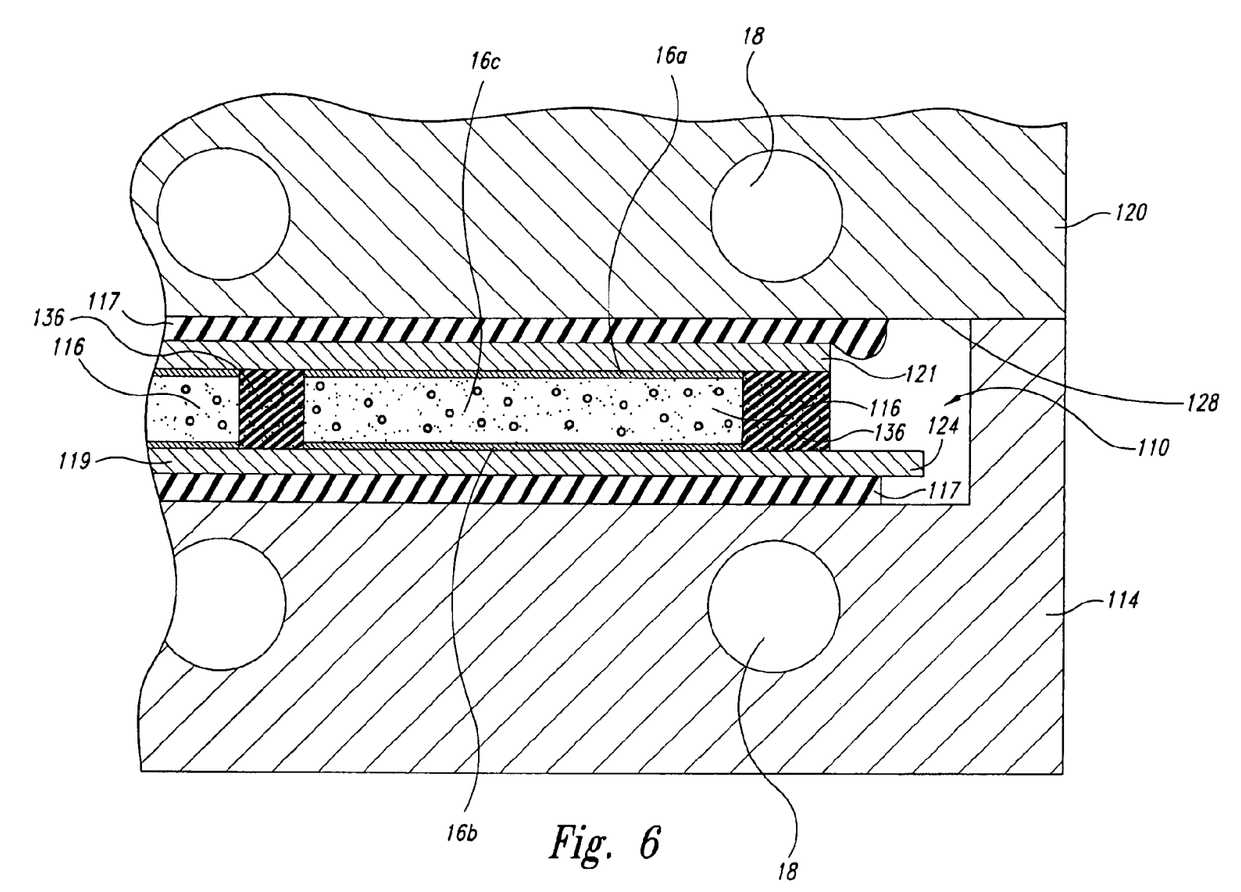
FIG. 6 is a cross-sectional side view of the embodiment of FIG. 5.

FIG. 5 shows an exploded view of a heater 100, according to another embodiment of the invention. FIG. 6 is a cross-sectional view taken along lines 6—6 of FIG. 5. A first heat exchanger block 114 is shown, having a surface 126 with a cavity or depression 110 formed therein. A selected minimum wall thickness T is provided on all sides of the cavity. A second heat exchanger block 120 having a surface 128 is configured to mate with the surface 126 of heat exchanger block 114. The blocks 114 and 120 may be constructed by casting aluminum or some other material around tubes, as taught with respect to blocks 13 and 14. The block 120 is illustrated in FIG. 6 as having a flat surface 128. Alternatively, the cavity 110 may be formed in both blocks 114 and 120 so that both have identical configurations and are interchangeable. According to an embodiment, the surfaces 126, 128 are not planar but are configured to mutually conform in shape. According to the embodiment illustrated in FIGS. 5 and 6, the cavity 110 has a planar surface to conform to the planar configuration of the heating assembly therein. According to alternative embodiments, the cavity 110 has a nonplanar surface that is configured to conform to a heating element or assembly having a nonplanar shape.

Electrically nonconductive alignment pins 132 are positioned in recesses 134 located toward each end of the cavity 110. Within the cavity 110 is an electrically isolating pad 117 formed of a material having a high coefficient of thermal conductivity. According to a preferred embodiment of the invention, the pad 117 has a degree of resilience and conformability, to conform to surface voids and irregularities, thus maintaining a maximum degree of contact for thermal transfer. The pad 117 includes alignment notches 138, which engage the alignment pins 132. Next to the pad 117 is a first power bus plate 119, which includes alignment notches 140 that engage the pins 132. A resilient and nonconductive alignment mask 136 is positioned adjacent the first bus plate 119. The mask 136 is provided with alignment notches 142 to engage the pins 132, and a plurality of cutouts 137.

A PTC heating element 116 is positioned in each respective cutout 137 of the mask 136, along the length of the bus plate 119. The PTC heating elements 116 are similar in construction to those previously described with reference to FIGS. 4A and 4B. In this embodiment, they do not include the individual electrical connections 16d and 16e. Additionally, they do not employ electrically insulating jackets 17 because they are connected to a common bus, as is explained herein.

Above the PTC heating elements 116 is a second power bus plate 121, and then a second electrically isolating pad 123 with respective alignment notches 140 and 138. The second heat exchanger block 120 is clamped to the first block 114 with the above listed components therebetween. The power bus plates 119 and 121 can be composed of aluminum, copper, steel, a silver coated substrate or any acceptable conductors. One plate 119 is coupled to one side of all the PTC elements 116 in parallel while the other plate 121 is coupled to the other side of all the PTC elements 116 in parallel. Power passes from bus 119, through elements 116 and into bus 121 to provide heating of all the elements in parallel, having the advantages as described elsewhere herein.

The electrically isolating pads 117, 123 have some degree of resiliency, such that the pressure of the clamping of the first and second heat exchanger blocks 114 and 120 compresses the pads 117, 123, which conform to the surfaces of the respective power bus plates 119, 121 on one side and the surfaces of the respective heat exchanger blocks 114, 120 on the other. Pressure is evenly maintained between the aluminum bus plates 119, 121 and the upper and lower surfaces of the PTC heating elements 116. A pressure is selected that ensures a dependable electrical connection between the power bus plates 119, 121 and the PTC elements 116, such that the conductive plates 16b and 16a are in electrical contact with the bus plates 119 and 121, respectively. Each power bus plate 119, 121 includes a contact tab 124.

Electrical connection wires 122, 123 from a power source 28 make contact with the power bus plates 119, 121 at contact tabs 124. An aperture 130 passing from the outside of the device 100 into the cavity 110 provides passage of the connections 122, 123 into the device. The aperture 130 may be closed by an explosion proof seal (not shown) configured to permit passage of the connection wires 122, 123. Such seals are well known in the industry and are used in other applications where combustion or explosion are a concern. Electrical power is provided via the electrical connection wires 122, 123 to the contact tabs 124 of the power bus plates 119, 121, and thence to each of the PTC heating elements 116.

The cavity 110 is of the proper depth such that when the heat exchanger blocks 114 and 120 are clamped together, the pads 117, power supply bus plates 119, 121 and PTC elements 116 are appropriately biased together, the surface 126 of block 114 is pressed against the surface 128 of block 120. This is to provide an explosion proof assembly.

Regulations governing safety ratings and certifications of devices such as those described according to the principles of the invention specify that, in order to be certified as safe for use in a given environment, the device must have features that fall within prescribed limits. For example, to be certified as explosion proof, according to some regulatory standards, a device used to vaporize flammable liquids must have a minimum selected wall thickness between a combustion source and the exterior of the device. The present invention provides walls of blocks 114 and 120 that meet this standard. For example, thickness T of sidewall 127 is selected to meet or exceed this minimum thickness.

In addition, passages in the wall or gaps between the two blocks 114 and 120 may be provided as vents to release pressure in the event of an internal combustion to avoid an explosion. If the vents are of the proper size, sufficient pressure cannot build up to cause an explosion. There is a relationship between the selection of the length and width of the gap or passages to provide the proper pressure release while ensuring that any flame occurring within the device cannot reach the exterior. Additionally, the overall volume and capacity of the device affect the parameters to be met for such certification. A device according to the embodiment of FIGS. 5 and 6 is configured to conform to a hazardous area rating Class I, Division 1, as described by the National Electrical Code (NEC). The device is thus rated sufficiently safe that, even if used in areas with the potential for explosive conditions, it will not explode nor initiate combustion in flammable materials that might be nearby. Previous vaporizers and heaters having similar capacities have required a separate protective casing to conform to safety standards.

In the case of the illustrated embodiment of the invention, the heat exchanger blocks 114 and 120 are configured to mate together to completely enclose the heating elements, power connections, and fluid heating tubes. The unit will thus comply with NEC standards without the need for additional shielding. The result is a significant reduction in cost of manufacture of the inventive device over known heaters and vaporizers. The blocks 114 and 120 provide the many purposes of enclosing the tubes, enclosing the heating elements, functioning as heat exchangers, and also providing the explosion proof enclosure.

It will be recognized that the explosion proof nature of the heat exchanger blocks illustrated in FIGS. 4 and 5 is independent of the type of heating element employed. Thus, PTC elements in configurations other than those disclosed herein, as well as other types of heating coils and elements used with heat exchanger blocks that encapsulate the elements are also within the scope of the invention. Inner surfaces of the cavity 110 need not be planar, but rather need only conform to the shape of the heating element being employed, in order to maximize the efficiency of the exchange of heat to the blocks 114 and 120 while providing an explosion-proof seal.

Each of the heat exchanger blocks 114 and 120 may be provided with a cavity of about half the depth of the single cavity 110 of FIGS. 5 and 6, with the cavities positioned opposite each other such that a cavity of the required dimensions is formed by a combination of the two cavities. A possible advantage of this configuration is that the blocks 114 and 120 could be designed to be identical, thus simplifying the manufacture and assembly of the device. In applications where explosion proofing is not an issue, whether because the environment in which it will be used does not require it, or because the fluid to be heated is not flammable, it is not required that a cavity be present, and the heat elements can be positioned between the blocks and sealed as appropriate for the desired application.

According to one embodiment, a cavity is not formed within the heat exchanger blocks, but rather, is formed by the inclusion of a plate, having an aperture passing from one side to another, sandwiched between the blocks. The openings of the aperture are on surfaces of the plate that are in contact with the heat exchanger blocks, and the aperture is sized to receive a heating element therein.

Operation of the device is as follows. A voltage supply is provided by a power source 28 to the heater 100 via electrical connection wires 122 and 123. The power bus plates 119 and 121 are provided electrical power through contact with the connection wires 122 and 123. The PTC heating elements are each connected to the power supply through the bus plates 119 and 121. The PTC heating elements 116 heat up to their cure temperature. Heat from the elements 116 is conducted through the power bus plates 119 and 121 and the electrical isolating pads 117 to the heat exchanger blocks 114 and 120. Heat is transmitted to fluid in the fluid heating tubes 18 where the fluid is heated or vaporized. The maximum rate of flow of fluid in the tubes 18 is regulated by the capacity control valve 30 to ensure that the fluid reaches the desired temperature. In some cases, the desired temperature may be at about the boil point for the fluid being heated, such as water, liquefied petroleum products, or some other fluid. For some fluids and uses, the temperature may be selected to ensure that the fluid is fully vaporized at the exit. Because of the self-regulating nature of the PTC elements 116, the elements 116 will automatically modify their current draw from the supply voltage 28, up to the maximum power rating of the elements to accommodate changes in the temperature or rate of flow of fluid entering the device.

The embodiment of FIGS. 5 and 6 has several advantages over known devices and previous embodiments. The use of the bus plates 119, 121 obviates the need for the individual connectors 16d and 16e, resulting in a simplified connection that is less expensive to manufacture and less prone to breakdown, resulting in a more economical and more dependable device.

While the invention has been described with reference to liquefied gas vaporizers, the principles of the invention may also be applied to other types of fluid heaters and vaporizers. Other applications of the invention include water heaters for domestic hot water, industrial applications such as preheating of fluids and gasses, and fluid heaters for hospital and other health care requirements, etc. The invention may be especially useful in healthcare applications, where fluid heating devices are closely regulated to prevent burns to patients in the event of malfunctions. Again, due to the self-regulating nature of the PTC elements employed, this is an extremely safe and economical device for such an application. Another application of the invention may be in vehicles powered by engines that burn hydrocarbon gases. Such vehicles generally carry tanks of liquefied gas, which must be vaporized prior to use.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A heating element, comprising:

first and second bus plates, and a plurality of positive temperature coefficient elements in electrical contact with, and sandwiched between the bus plates in an electrically parallel configuration, each positive temperature coefficient element including:

first and second conductive plates, and a plurality of positive temperature coefficient heating stones in electrical contact with, and sandwiched between the conductive plates in an electrically parallel configuration.

2. The heating element of claim 1 wherein the heating element further comprises first and second thermally conductive and electrically insulative pads positioned, respectively, in face to face contact with the first bus plate on a side opposite the plurality of positive temperature coefficient elements, and in face to face contact with the second bus plate on a side opposite the plurality of positive temperature coefficient elements.

3. A fluid heater, comprising:

a first heat exchanger block having a first surface; and heating element having a second surface in thermal contact with the first surface, the heating element including first and second bus plates and a plurality of positive temperature coefficient elements in electrical contact with, and sandwiched between the bus plates in an electrically parallel configuration, each positive temperature coefficient element including:

first and second conductive plates, and a plurality of positive temperature coefficient heating stones in electrical contact with, and sandwiched between the conductive plates in an electrically parallel configuration.

4. The fluid heater of claim 3, further comprising a cavity formed in the first surface, in which the heating element is positioned.

5. The fluid heater of claim 3, further comprising a fluid heating tube within the first heat exchanger block.

6. The fluid heater of claim 3 wherein the heating element further includes a third surface, the fluid heater further comprising a second heat exchanger block having a fourth surface, the second heat exchanger block positioned such that the fourth surface is in thermal contact with the third surface.

7. The fluid heater of claim 6, further comprising a fluid heating tube within the second heat exchanger block.

8. The fluid heater of claim 6, further comprising a depression formed in each of the first and fourth surfaces, the depressions of the first and fourth surfaces together forming a cavity in which the heating element is positioned.

9. The fluid heater of claim 8 wherein the first and fourth surface are in face-to-face contact.

10. A fluid heater, comprising:
a first heat exchanger block having therein a fluid heating tube, the first block having a first surface;
a second heat exchanger block having therein a fluid heating tube, the second block having a second surface, and the second block positioned, relative to the first block, such that the first and second surfaces are adjacent to each other;
a cavity formed in the first surface, the cavity having a third surface on an inner face thereof; and
a heating element having fourth and fifth surfaces on opposing sides thereof positioned within the cavity with the fourth surface in face to face contact with the third surface and the fifth surface in face to face contact with the second surface, the heating element being fully encapsulated within the cavity.

11. The fluid heater of claim 10 wherein the heating element comprises:
first and second bus plates; and
a plurality of positive temperature coefficient elements in electrical contact with, and sandwiched between the bus plates in an electrically parallel configuration.

12. The fluid heater of claim 11 wherein each of the positive temperature coefficient elements comprises first and second conductive plates and a plurality of positive temperature coefficient heating stones in electrical contact with, and sandwiched between the conductive plates in an electrically parallel configuration.

13. The fluid heater of claim 11 wherein the heating element further comprises first and second thermally conductive and electrically insulative pads positioned respectively between the first bus plate and the first surface and between the second bus plate and the third surface.

14. The fluid heater of claim 10, further comprising:
an aperture in the first heat exchanger block communicating from the cavity to an outer surface of the first block;
an electrical power supply cable coupled at a first end to the heating element and passing through the aperture such that a second end of the cable lies outside of the first block; and
an explosion proof seal closing the aperture around the cable.

15. The fluid heater of claim 10 wherein the first and second surfaces are spaced a selected distance apart.

16. A fluid heater, comprising:
a first heat exchanger block having therein a fluid heating tube, the first block having a first surface;
a second heat exchanger block having therein a fluid heating tube, the second block having a second surface, and the second block positioned, relative to the first block, such that the first and second surfaces are adjacent to each other;
a first cavity formed in the first heat exchanger block in the first surface;
a second cavity formed in the second heat exchanger block in the second surface, the second cavity positioned such that, when the first and second surfaces are in face to face contact, the first and second cavities are opposite one another and form a chamber between the first and second blocks; and
a heating element fully encapsulated within the chamber.

17. The fluid heater of claim 16 wherein the first surface is non-planar and the second surface is configured to conform to the non-planar first surface.

18. The fluid heater of claim 16, further comprising means for equalizing pressure between the chamber and the outside of the fluid heater.

19. The fluid heater of claim 16 wherein a shape of the chamber conforms to a shape of the heating element.

20. A fluid heater, comprising:
a heating element having first and second surfaces on opposing sides thereof, the heating element including:
first and second bus plates, and
a plurality of positive temperature coefficient heating elements in electrical contact with, and sandwiched between the bus plates in an electrically parallel configuration, each positive temperature coefficient element including:
first and second conductive plates, and
a plurality of positive temperature coefficient heating stones in electrical contact with, and sandwiched between the conductive plates in an electrically parallel configuration;
a first heat exchanger block having a fluid heating tube therein, the first block having a third surface;
a second heat exchanger block having a fluid heating tube therein, the second block having a fourth surface; and
the first and second blocks and the heating element positioned such, that the first and second surfaces are in face to face contact with the third and fourth surfaces, respectively, with the heating element sandwiched therebetween.

21. The fluid heater of claim 20 wherein:
the first heat exchanger block includes a fifth surface lying in a plane parallel to the third surface and a first selected distance therefrom;
the second heat exchanger block includes a sixth surface lying in a plane parallel to the fourth surface and a second selected distance therefrom;
the first block is configured such that the third surface constitutes a back wall of a cavity formed in the fifth surface, the cavity configured such that, when the first and second surfaces are adjacent to the third and fourth surfaces, respectively, the fifth surface is adjacent to the sixth surface, encapsulating, thereby, the heating element.

22. The fluid heater of claim 21 wherein the second selected distance is zero, such that the second and sixth surfaces are the same surface.

23. The fluid heater of claim 21 wherein the second selected distance is greater than zero, such that the second surface constitutes a back wall of a cavity formed in the sixth surface.

24. The fluid heater of claim 20 wherein the heating element further comprises first and second thermally conductive and electrically insulative pads positioned, respectively, between the first bus plate and the third surface and between the second bus plate and the fourth surface.

25. The fluid heater of claim 20 wherein the heating element further comprises an alignment mask sandwiched, with the plurality of positive temperature coefficient elements, between the first and second bus plates, the alignment mask including a plurality of cutouts evenly spaced along a length thereof, and wherein each of the plurality of positive temperature coefficient elements is positioned within a corresponding one of the plurality of cutouts, the alignment mask formed from an electrically nonconductive and compressible material.

26. The fluid heater of claim 20 wherein:
the first heat exchanger block includes a recess in the third surface;
the fluid heater further comprises an alignment pin positioned within the recess such that a first end of the pin extends from the recess generally perpendicularly to the third surface; and
the first and second bus plates of the heating element include respective alignment notches positioned such that, when the heating element is correctly positioned between the third and fourth surfaces, the respective alignment notches of the first and second bus plates engage the alignment pin.

27. The fluid heater of claim 20, further comprising a plate having fifth and sixth surfaces on opposite sides thereof and an aperture, passing from the fifth to the sixth surface, of a size sufficient to encompass the heating element, the plate positioned such that the fifth surface is adjacent to the third surface and the sixth surface is adjacent to the fourth surface, with the heating element encapsulated within the aperture of the plate and between the third and fourth surfaces.

28. The fluid heater of claim 27 wherein the third and fourth surfaces are non-planar and configured to mate with the fifth and sixth surfaces of the plate, respectively.

29. A method for heating a fluid, comprising:
introducing a fluid into a first end of a first tube encased in a first block of thermally conductive material having a surface;
extracting the fluid from a second end of the tube;
introducing the fluid into a first end of a second tube encased in a second block of thermally conductive material having a surface, the first and second blocks arranged such that the respective surfaces are adjacent; and
applying a voltage to a heating element fully encapsulated in a cavity between the first and second blocks, thereby:
heating the element, the thermally conductive material of the first and second blocks in contact therewith, and the first and second tubes, and
heating the fluid.

30. The method of claim 29 wherein heating the first and second tubes comprises heating the first and second tubes to a temperature exceeding the saturation temperature of the fluid, and wherein heating the fluid comprises vaporizing the fluid.

31. The method of claim 30 wherein the fluid is a liquefied gas.

32. The method of claim 29 wherein the heating element comprises first and second bus plates and a plurality of positive temperature coefficient elements in electrical contact with, and sandwiched between the bus plates in an electrically parallel configuration, each positive temperature coefficient element including first and second conductive plates and a plurality of positive temperature coefficient heating stones in electrical contact with, and sandwiched between, the conductive plates in an electrically parallel configuration.

* * * * *